United States Patent [19]

Rohan

[11] Patent Number: 4,685,884

[45] Date of Patent: Aug. 11, 1987

[54] MEANS FOR SIMULATING A TOPOGRAPHICAL AREA

[76] Inventor: Kieran P. Rohan, 4014 SE. Howe, Milwaukie, Oreg. 97222

[21] Appl. No.: 822,845

[22] Filed: Jan. 27, 1986

[51] Int. Cl.⁴ .......................... G09B 25/06; A63F 9/12
[52] U.S. Cl. .................................... 434/152; 273/157 R
[58] Field of Search .......................... 434/150, 152, 96; 273/157 R

[56] References Cited

U.S. PATENT DOCUMENTS

| | | | |
|---|---|---|---|
| 964,065 | 7/1910 | Snedeker | 434/150 |
| 1,213,064 | 1/1917 | Bjornstad | 434/152 |
| 1,893,944 | 1/1933 | Johnson | 434/96 |
| 2,751,706 | 6/1956 | Metal | 273/157 R X |
| 3,025,626 | 3/1962 | Schumacher | 434/152 X |
| 3,981,506 | 9/1976 | Daniel et al. | 273/157 R |
| 4,192,083 | 3/1980 | Rebbeck | 434/152 X |

*Primary Examiner*—William H. Grieb
*Attorney, Agent, or Firm*—James D. Givnan, Jr.

[57] ABSTRACT

A multitude of parts of three-dimensional shape have full edges and also edge segments adapted for abutment with like edges and edge segments of other parts. The parts additionally include non-abutting irregular or curved edges which may represent terrain contour lines or the bank of a body of water. Inclined areas on the parts are adjacent the irregular or curved edges and represent sloped terrain which is continuous with like inclined areas on other abutting parts. The inclined area of a part may be dispensed with to provide a vertical surface to simulate an escarpment.

10 Claims, 5 Drawing Figures

MEANS FOR SIMULATING A TOPOGRAPHICAL AREA

BACKGROUND OF THE INVENTION

The present invention pertains to means for simulating a topographical area in a three dimensional display.

For various purposes it is often desirable to provide a display of a topographical area as for example land use planning, real estate promotion and recreational purposes, the latter including the playing of war games with miniature pieces.

Attempts to provide such representations has, to the extent known, been done as costly scaled replicas with no provision made for rearrangement of components to simulate a variety of different geographical areas, real or imagined.

Previous efforts to provide a three dimensional representation of a geographical area are found in U.S. Pat. No. 3,025,626 with the ground area being incidental to toy train trackage on each component.

The prior art arrangements fail to provide for simulating a variety of topographical features such as sloped areas, hills, lakes, streams, etc., all of which may be varied to suit the users purposes.

SUMMARY OF THE PRESENT INVENTION

The present invention pertains generally to means for rendering a miniature display of a real or imaginative geographical area wherein the members are shaped to permit a wide variety of member combinations to simulate the topographical area desired.

The parts or members of the present invention include upright edges for abutment with like sized and shaped edges of other parts. Certain parts additionally include a free or non-abutted curved edge. Contiguously formed with the curved edge of each part or member is an inclined surface representing sloped terrain. The inclined surface of the part may be dispensed within a modified form of part where it is desired to simulate an escarpment.

Edge segments on the parts are of a length to uniformly abut the edge segments of other parts whereby the curved edges of the abutting pieces will appear to be continuous. Similarly the inclined surfaces of abutting pieces are of like inclination and magnitude to provide the appearance of a continuous sloped area of a hill, ridge, etc.,.

Important objectives of the present invention include the provision of means for providing a topographical simulation using a variety of parts shaped so as to permit the selective abutment of same with other parts to render virtually an unlimited number of terrain simulations; the provision of a topographical simulation using parts which lend themselves to convenient use and low cost production methods; the provision of topographical simulation which achieves a truer simulation than was heretofore possible with other arrangements.

DETAILED DESCRIPTION OF THE PREFERRED EMBODIMENTS

Figure 1:
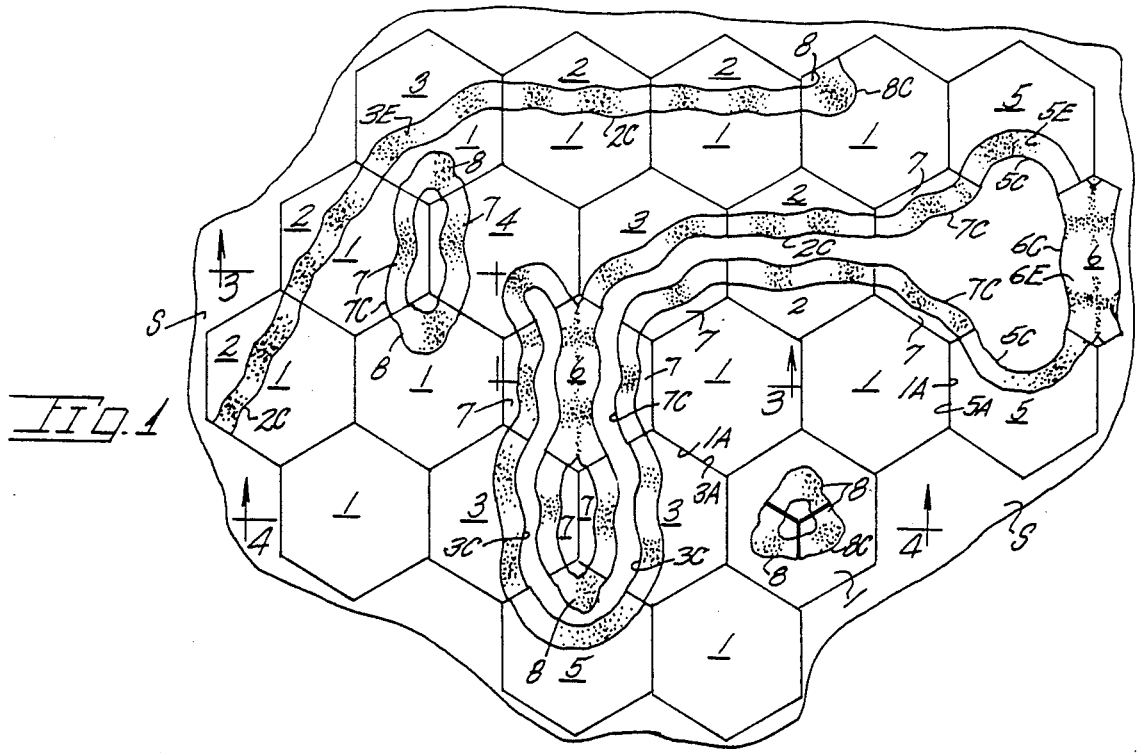
FIG. 1 is a plan view of a typical simulation of a geographical area.

With continuing attention to the drawings wherein applied reference numerals indicate parts similarly hereinafter identified, the reference numeral 1 identifies a part being of polygonal shape such as hexagonal.

Member 1 has a perimetrical edge 1A for abutment with corresponding edges on like parts or later described parts. The upper and lower surfaces of members 1 are planar.

A second part at 2 of the present means for simulating a topographical area in a three dimensional display includes edges at 2A with certain of side edges at 2B being of lesser length and hence termed edge segments. A curved free or non-abutted edge is at 2C while a curved intersection at 2D denotes the terminus of a sloped or inclined area 2E with a planar surface 2F of the part.

Similarly parts at 3, 4 and 5 each include edges 3A, 4A and 5A with edge segments at 3B, 4B and 5B and curved free or non-abutted edges 3C, 4C and 5C. Intersections at 3D, 4D and 5D denote intersections between sloped or inclined areas 3E 4E and 5E and the respective planar surfaces 3F, 4F and 5F of the parts.

Additional parts of the present topographical simulating means include parts at 6, 7 and 8 with part 6 having edge segments at 6B, curved free or non-abutted edges 6C, an intersection 6D denoting the intersection between sloped or inclined areas 6E. Planar surfaces are at 6F.

Member 7 includes an edge 7A, edge segments 7B, a curved free edge 7C, an intersection at 7D defining the intersection of a sloped or inclined area 7E with a planar surface 7F.

Member 8 includes edge segments 8B, a curved free or non-abutted edge 8C and an intersection at 8D defining the intersection of a sloped area 8E with a planar surface 8F.

It is to be noted that the edge segments 2B through 8B are of corresponding shape and size to permit matching abutment of any edge segments with a remaining edge segment to provide a continuation of the curved free edges 2C through 8C as well as a continuation of inclined surfaces 2E through 8E and lines of intersection 2D through 8D.

Similarly the edges 1A, 2A, 3A, 4A, 5A and 7A are of like magnitude and shape to permit matching abutment with one another.

A connector at 10 serves to insertably engage two or more parts to hold same together and for this purpose may be pointed to facilitate insertion. The part corners may be slotted as at 11 to receive the connector end.

With the present set of parts it is possible to simulate virtually an unlimited number of geographical areas either actual or imagined. Features of the terrain may include flats, valleys, hills, ridges, bodies of water, etc., all of which may be a selected shape to suit the user's purposes.

The surfaces of the parts may be painted or flocked to provide a non-skid surface for the retention of miniature game pieces thereon. Areas representing bodies of water may be provided with appropriate colored sheet material which extends beyond the curved edges of the parts defining a body of water.

The parts 1 through 8 have contiguous edges which define an included angle of greater than 90 degrees and shown as at X of 120 degrees. Part 1 is a hexagon.

A supporting surface for the parts is indicated at S. The parts may be formed from expanded rigid polystyrene foam with the inclined surfaces 2E, 3E, etc., formed at approximately twenty degrees to the horizontal.

Figure 5:
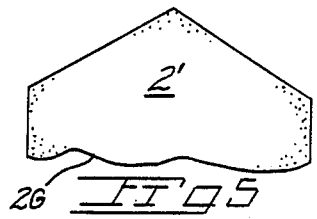
FIG. 5 is a plan view of a part typically resembling an escarpment.
Figure 3:
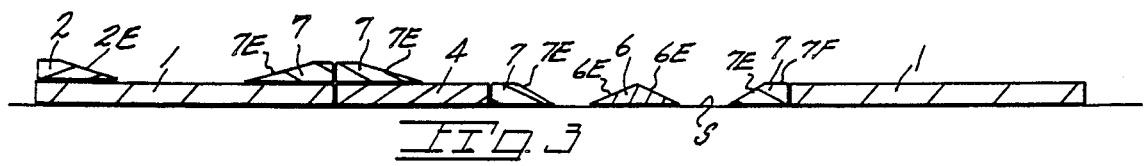
FIG. 3 is a sectional view taken along line 3—3 of FIG. 1.
Figure 4:
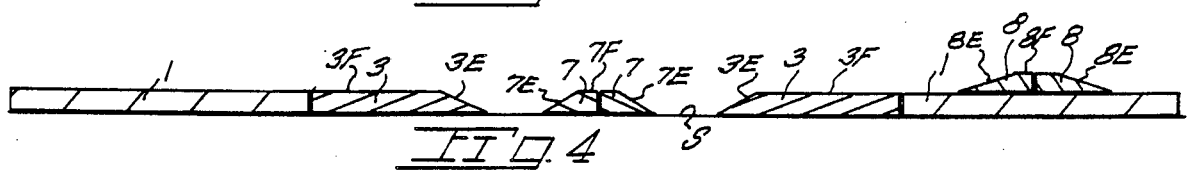
FIG. 4 is a sectional view taken along line 4—4 of FIG. 1.
Figure 2:
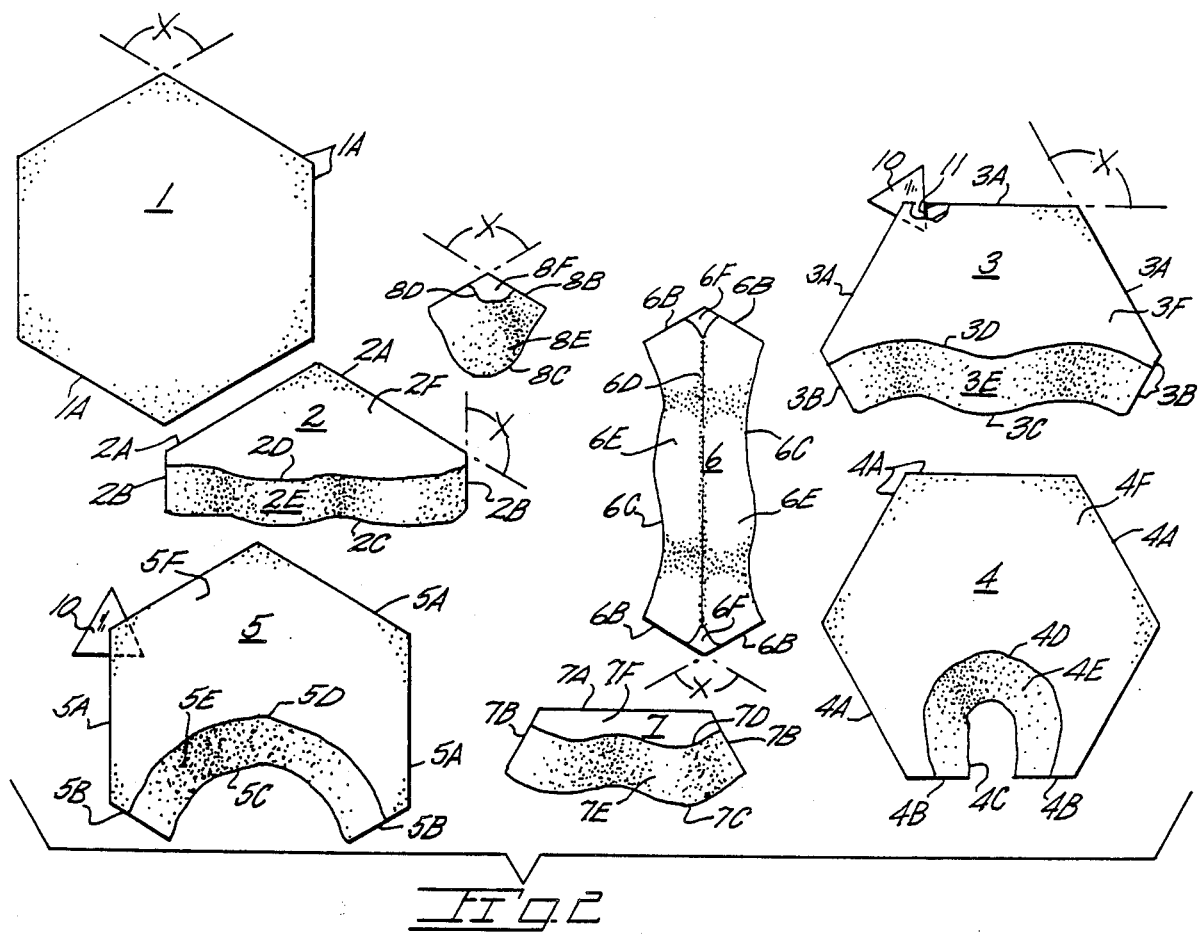
FIG. 2 is a composite plan view of the parts used in FIG. 1 but with the parts shown on a greater scale.

The part 2' in FIG. 5 corresponds to earlier described part 2 with the exception that the inclined surface is dispensed with in order to simulate an escarpment at 2G. Obviously other parts may be so modified to simulate an escarpment of some length.

By forming the parts with like included angle defined by contiguous edges, edge segments, or a combination of same, as at the included angle at X of 120 degrees assembly of the parts to accurately simulate natural terrain is greatly enhanced.

While I have shown but a few embodiments of the invention, it will be apparent to those skilled in the art that the invention may be embodied still otherwise without departing from the spirit and scope of the invention.

Having thus described the invention, what is desired to be secured in a Letters Patent is:

1. Means for simulating a geographical area and comprising in combination,
   three-dimensional parts having edges adapted for abutment with an edge of another of said parts,
   at least some of said parts additionally including a curved free edge and an inclined area contiguous with said curved free edge, and
   at least some of said parts including a planar surface for superimposition of other of said parts.

2. The means as claimed in claim 1 wherein said edges additionally include edge segments.

3. The means as claimed in claim 2 wherein said edges and said edge segments are respectively of like length for purposes of coterminous abutment.

4. The means claimed in claim 1 wherein said edges of a part when contiguous define an included angle greater than ninety degrees.

5. Means for simulating a geographical area and comprising in combination,
   a multitude of three-dimensional parts,
   said parts each having upright edges for abutment with like upright edges of other parts,
   certain of said parts having a curved edge and an inclined area contiguous with said curved edge.

6. The means claimed in claim 5 wherein said parts additionally include upper and lower planar surfaces to facilitate superimposing parts.

7. The means claimed in claim 5 wherein said parts additionally include an intersection denoting said planar surfaces and said inclined area.

8. Means for simulating geographical area and comprising in combination,
   a multitude of parts having upright edges for abutment with one another,
   said parts having at least one curved free edge and an inclined area contiguous with said curved free edge, and
   said parts also having planar surfaces on which may be superimposed other of said parts.

9. The means claimed in claim 8 additionally including a part of hexagonal shape, each part of said multitude of parts having contiguous edges defining an included angle of 120 degrees.

10. The means claimed in claim 8 additionally including connector means insertably engageable with parts in abutment with one another.

* * * * *